(12) United States Patent
Tupler et al.

(10) Patent No.: US 7,212,111 B2
(45) Date of Patent: May 1, 2007

(54) METHOD AND SYSTEM FOR USE IN EMERGENCY NOTIFICATION AND DETERMINING LOCATION

(75) Inventors: Amy M. Tupler, Hollywood, FL (US); Von A. Mock, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/748,881

(22) Filed: Dec. 30, 2003

(65) Prior Publication Data

US 2005/0151642 A1 Jul. 14, 2005

(51) Int. Cl.
*G08B 1/08* (2006.01)

(52) U.S. Cl. .............. 340/539.18; 379/45; 455/404.1; 455/404.2; 455/456.1; 455/521

(58) Field of Classification Search ..............................
340/539.1–539.24, 825.49; 455/404.1, 404.2, 455/456.2; 379/45, 37; 701/213
See application file for complete search history.

(56) References Cited

U.S. PATENT DOCUMENTS

| | | | | |
|---|---|---|---|---|
| 5,557,254 A | * | 9/1996 | Johnson et al. | 340/426.19 |
| 5,572,204 A | * | 11/1996 | Timm et al. | 340/988 |
| 5,686,910 A | * | 11/1997 | Timm et al. | 340/988 |
| 6,696,956 B1 | * | 2/2004 | Uchida et al. | 340/573.1 |
| 6,768,417 B2 | * | 7/2004 | Kuragaki et al. | 340/425.5 |
| 7,006,822 B2 | * | 2/2006 | Kashu et al. | 455/421 |
| 7,031,724 B2 | * | 4/2006 | Ross et al. | 455/456.1 |
| 7,046,140 B2 | * | 5/2006 | Adamczyk et al. | 340/539.18 |
| 7,076,235 B2 | * | 7/2006 | Esque et al. | 455/404.1 |
| 7,119,716 B2 | * | 10/2006 | Horstemeyer | 340/994 |
| 2002/0042846 A1 | * | 4/2002 | Bottan et al. | 709/249 |
| 2002/0169584 A1 | * | 11/2002 | Fu et al. | 702/188 |
| 2004/0113768 A1 | * | 6/2004 | Rodgers | 340/506 |
| 2004/0152441 A1 | * | 8/2004 | Wong | 455/404.1 |
| 2004/0227629 A1 | * | 11/2004 | Adamczyk et al. | 340/539.18 |
| 2005/0031102 A1 | * | 2/2005 | Kraus et al. | 379/114.2 |
| 2005/0124318 A1 | * | 6/2005 | Jeon | 455/411 |
| 2005/0239477 A1 | * | 10/2005 | Kim et al. | 455/456.1 |

* cited by examiner

Primary Examiner—Benjamin C. Lee

(57) ABSTRACT

The present embodiments provide methods, systems and apparatuses for use in providing notification of emergency services as well as notifying additional individuals and/or groups of an emergency. Some embodiments provide methods for use in dispatching emergency services (136) and notifying one or more additional contacts (140). These methods wirelessly receive a request for emergency services (212) from a remote wireless device (122), retrieve an emergency contact list according to the type of emergency (216) and determine at least one emergency contact other than emergency services according to the contact list (436). Once identified, the contact is notified of the request for emergency services (442). Some embodiments further determine a mode of communicating with the emergency contact (440) and notify the contact according to the mode of communication. Some methods additionally determine one or more types of emergency services to be dispatched (432) and notify types of emergency services (434).

19 Claims, 4 Drawing Sheets

METHOD AND SYSTEM FOR USE IN EMERGENCY NOTIFICATION AND DETERMINING LOCATION

FIELD OF THE INVENTION

The present invention relates generally to providing notification of an emergency, and more particularly to provide notification of emergency situations utilizing wireless communication.

BACKGROUND OF THE INVENTION

The use of wireless devices for wirelessly communicating has dramatically increased. Wireless communication provides users with a great deal of mobility and flexibility. Further, these devices provide users with added security. For example, if a user's vehicle breaks down, the user can utilize their wireless device to easily call for assistance. Some wireless devices can further identify a user's location within a given margin of error. This allows, for example, a responding party to more easily locate the user.

Similarly, some of these wireless devices can be used to call an ambulance in the event that the user is injured. Additionally, users can use wireless devices to contact other public services, such as the police or fire department, in case of other emergencies. The contact of emergency services, however, is limited because the user must usually initiate the call. This limits the safety benefits that can be provided by wireless devices.

Therefore, although some wireless devices may provide some potential benefits, a number of significant impediments to their usage exist and are possibly serving to limit or deter further beneficial implementations.

BRIEF DESCRIPTION OF THE DRAWINGS

The above needs are at least partially met through provision of the methods and systems for use in emergency notification of emergency services and one or more predefined dynamic groups described in the following detailed description, particularly when studied in conjunction with the drawings, wherein.

Figure 1:
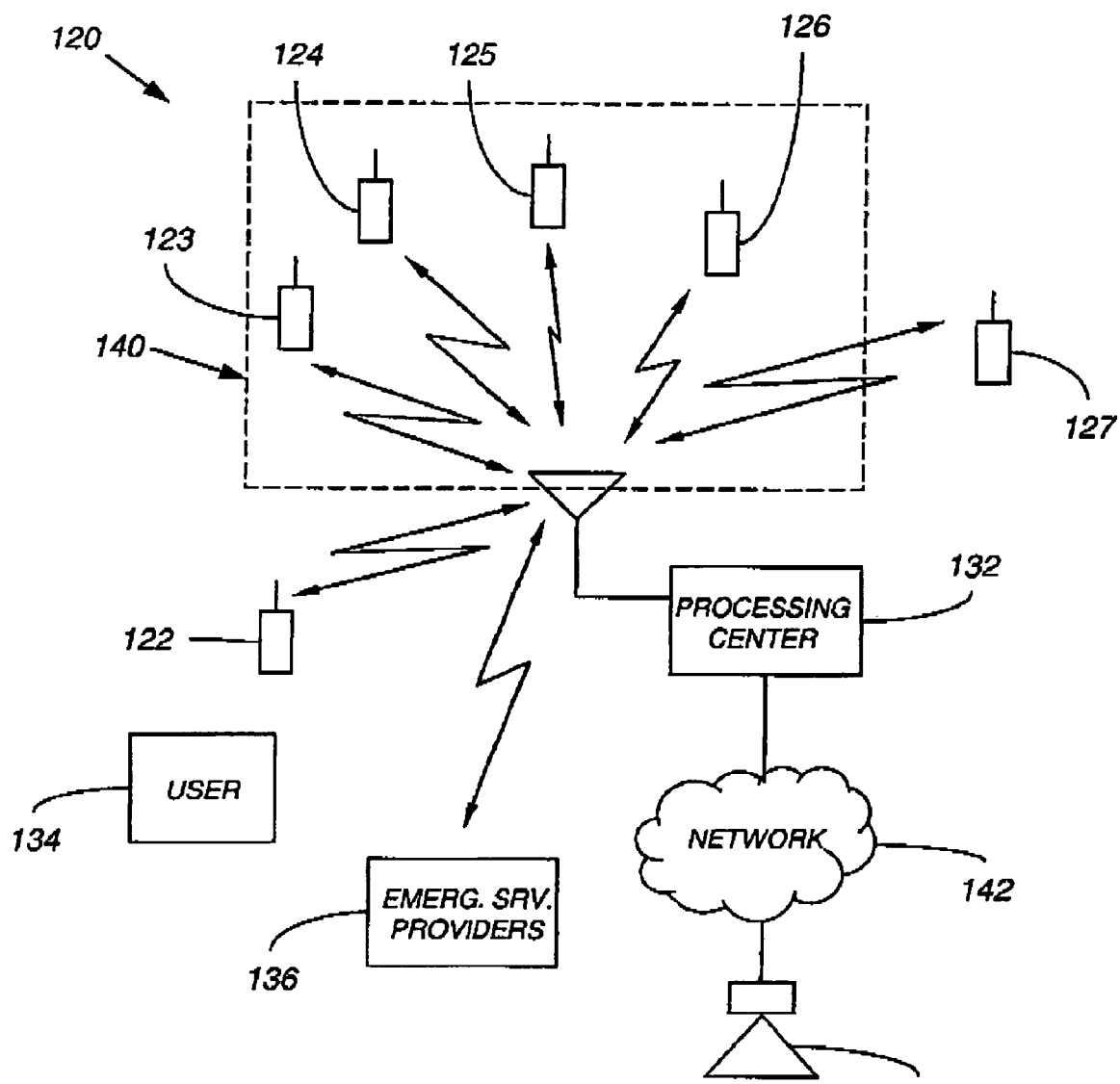
FIG. 1 depicts a simplified block diagram of a wireless communication system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Present embodiments provide methods and systems for notifying emergency services that an emergency situation exits, as well as notifying one or more identified individuals and/or groups about the emergency situation. The additional individuals and/or groups are typically previously defined and can include contact for a spouse, children, parents, guardian, care giver, home health monitoring service, doctor or other licensed practitioners such as a mid wife and other individuals or groups. As such, the present embodiments can notify family members (e.g., parents, spouse, children, guardian) and other individuals in the event that someone is injured or in need of help.

Some preferred embodiments provide a method for use in providing wireless communication where a request for emergency services can be wirelessly received. Once received, the method identifies a user from whom the emergency services are requested and evaluates the request for emergency services. The method further retrieves an emergency contact list containing at least one member to be contacted, dispatches one or more emergency services, and contacts the at least one member of the emergency contact list and notifies the member of the received request for emergency services. In some embodiments, the contacting of the at least one member comprises issuing a message to an identified device associated with the at least one member of the contact list. The method can further establish communication between the identified user submitting the request for emergency services and at least one of the dispatched emergency services. Further, the establishment of communication between the user and the at least one dispatched emergency service can include providing push to talk capabilities for each of the users submitting the request and the one or more emergency services.

Some embodiments provide a method for use in dispatching emergency services and notifying one or more additional contacts. The method includes wirelessly receiving a request for emergency services from a remote wireless device, determining a type of emergency, retrieving an emergency contact list according to the type of emergency, determining at least one emergency contact other than emergency services according to the emergency contact list and notifying the at least one emergency contact of the request for emergency services. The method, in some further embodiments, can further determine a mode of communication with the at least one emergency contact, such that the notifying of at least one emergency contact comprises notifying the at least one emergency contact according to the determined mode of communication. Additionally, the method can further comprise determining one or more types of emergency services to be dispatched according to the type of emergency and notifying at least one emergency service.

In some embodiments, a system for providing emergency notification is provided, where the system includes a processor, a memory that stores at least one emergency contact list and a wireless transceiver that wirelessly receives a request for emergency service. The processor evaluates the received request for emergency service, retrieves the at least one emergency contact list associated with the received request for emergency services, and generates a communication to at least one member identified from the at least one emergency contact list. The processor can, in some embodiments, communicate to a plurality of members identified from the at least one emergency contact list to notify each of the plurality of members of the request for the emergency service. Some embodiments of the system further include a wireless communication device that wirelessly transmits the request for emergency service. Additionally in preferred embodiments, the processor in some instances further determines a type of emergency and notifies at least one emergency service of the request for emergency service.

Previous systems have been described for use in notifying emergency personnel and dispatching the emergency personnel in the event of an accident. More particularly, published U.S. patent application Ser. No. 09/736,489 (Publication No. U.S. 2002/0072348), published on Jun. 13, 2002, incorporated herein by reference in its entirety, describes a method for requesting and dispatching emergency services to a wireless communication customer. A request is wirelessly transmitted by the customer and is received by a monitoring center. The monitoring center determines a location of the customer requesting the emergency service, reviews a customer profile and evaluates the nature of the request for services according to the profile. Once evaluated, the monitoring center dispatches the request to a pool of emergency services providers. This service is very beneficial in obtaining rapid emergency response time. This service fails, however, to provide notification to other individuals that might need to know that an emergency request has been initiated.

Alternatively, the present embodiments allow a customer to request emergency services, and further automatically notify individuals in a selective dynamic group or network of an impending, occurring, or immediately passed emergency. For example, if a child is injured and requests emergency services, the request not only is routed to a processing center to evaluate the request, but the parents or guardians of the child are also automatically notified. This allows the parent(s) and/or guardian to take appropriate action, such as proceeding to a hospital, providing the emergency services with needed information (e.g., allergies, insurance information, permission for treatment, living will, healthcare surrogate paperwork and the like), and other such actions.

FIG. 1 depicts a simplified block diagram of a wireless communication system 120. The system allows a plurality of wireless communication devices 122–127 to communicate with each other, as well as communicate with wired communication devices 130. Further, any one of the wireless devices 122–127 can communicate with a processing center 132. The processing center can be a wireless communication provider, a separate and/or independent entity providing emergency dispatching services or other entity. In typical operation, a user 134 uses the wireless device 122 to wirelessly communicate with others using wireless devices, wired devices, computers or other devices.

In an emergency situation, however, the user 134, or the wireless device 122 without input from the user, can contact the processing center 132 to request emergency services. Upon receipt of the emergency request the processing center evaluates the request. Based on the evaluated request, the processing center notifies and/or dispatches emergency service providers 136. The notification to the emergency services 136 can be achieved through wireless communication and/or wired communication (such as through a wired and/or wireless network 142). In some preferred embodiments, the emergency request additionally triggers the processing center to generate a group communication 140, which can include wireless and/or wired devices 123–126, 130. The processing center accesses a group list associated with the requesting user 134. Typically, the group is previously defined by the user and/or individuals and/or groups associated with the user, such as wife, husband, father, mother, guardian, school officials, doctor, and other individuals, groups and/or associations. Once the group list is retrieved, contact information is extracted from the group list and communication is established with the individual or individuals according to the communication parameters established in the contact group list.

This contact with the members of the contact list can be achieved through wireless contact, wired contact, or substantially any contact method. In some embodiments, the contact is established through messages. A message can be one of or a combination of: text, audio, picture and/or video, and additionally a message can be part of a multimedia message or an instant messaging application. A message is generated and wired or wirelessly forwarded to one or more of the members of the group. Further, in some embodiments, the contact interrupts and preempts any current communication that might be currently active when the emergency contact is issued (for example, the notification can interrupt a currently active cellular phone call). Still further, in some embodiments, the system 120 can establish immediate communication between one or more of the members of the contact group or network. For example, if the user/victim is a minor, the system 120 can establish immediate communication between mother and father through a cellular connection, messaging, push to talk capabilities or other communication techniques.

When issuing a request for emergency services, the user 134 or another individual (such as a witness to an accident) can initiate the request through the wireless device, such as dialing 911 on a wireless phone, directly dialing the fire department, police department, or hospital, selecting a panic button, entering a specific code, calling a specific phone number, or other techniques for requesting emergency services. In some embodiments, the user can utilize a wireless phone as a data device to notify emergency personal and/or the processing center 132 utilizing instant messaging emergency contacts. Alternatively, the wireless device can be configured to initiate the request based on predefined conditions. Such an approach can perhaps better accommodate situations when the user 134 may be unable to notify emergency services. For example, when the user is unconscious, in shock, too injured to access and/or utilize the wireless device 122, or other situations.

Some embodiments provide wireless devices that sense conditions and initiate contact with the processing center 132. In these embodiments, the wireless device would utilize sensors, monitors, and other methods for determining conditions. The conditions to be monitored can be substantially any possibly relevant condition. For example, the sensors can monitor heart rate, temperature, air bag deployment, smoke or other air contaminants, location, sudden acceleration, and other conditions. These sensors are utilized to determine potential emergency situations. The sensors can be incorporated into the wireless device, or the sensors can couple with the wireless device to allow the wireless device to monitor the condition(s) as detected by the sensor(s).

As one example, if a user 134 falls off their bicycle and hits the ground unconscious, the hard impact can be detected by an accelerometer sensor. The accelerometer can initiate contact (e.g., through messaging) with the processing center 132 of the emergency situation. The processing center can then initiate emergency procedures. In some embodiments, the wireless device 122 and/or the accelerometer can further initiate an event for the wireless device to verify that the user 134 is indeed in need of medical assistance. For example, the accelerometer can trigger the wireless device to signal the user requesting verification of the user's safety, such as if the wireless device is a wireless phone, the sensor can trigger the phone to ring and if the user does not answer the ring, the wireless device or sensor initiates automatic communication with the processing center 132. Additionally and/or alternatively, the sensor can initially communicate with the processing center and the processing center can initiate communication with the user to verify the user's safety.

If the wireless device and/or the processing center fail to receive confirmation that the user is safe, the processing center can initiate notification of emergency services, and additionally initiates the notification to the predefined emergency contact group. The initiated notification can notify, for example, an ambulance, a hospital, a family physician, police, spouse, parents and/or guardian, and others as defined in the emergency notification group. Further, the emergency contact or distribution list can include restrictions (such as temporally-based restrictions) on those individuals/groups to be contacted. For example, if the user is a minor, a school administration might be contacted. However, that contact with the school administration can be limited to week days between the hours that the minor would normally be traveling to school, in school and traveling from school. Similarly, a family physician can be notified of an emergency depending on the time of day.

Further, the processing center 132 can additionally utilize the type of request and/or the type of sensor initiating the request to determine potential types of emergency services that are needed. Again in the example above, if the accelerometer initiates the emergency services request, the processing center 132 can anticipate that an impact occurred (e.g., falling off a bicycle, a car accident or other impact) and can anticipate potential corresponding injuries, which can be forwarded to the emergency services, such as an ambulance, hospital to be receiving the victim, a physician and other services. Further, the emergency services (e.g., ambulance and hospital) can utilize the advanced notice of the potential injuries to make appropriate preparations for treating the victim.

As another example, if the sensors detect smoke and/or heat exceeding predefined levels, the processing center can anticipate a fire and notify emergency services, such as the fire department, ambulance and hospital, as well as contacting those indicated on an emergency contact list, such as spouse, parent(s), guardian(s), caregivers, siblings, school administration (e.g., for minors), family physician, specialist (e.g., cardiologist, obstetrician and the like), psychologist and/or other individuals designated. The processing center 132 can further notify the hospital and/or ambulance of the types of potential injuries that might be expected, such as smoke inhalation, burns and other injuries associated with fire. This allows the emergency services to better prepare and thus provide better services.

In notifying emergency services, the processing center 132 can, in some embodiments, further determine a user's location. This location can be determined by a user (or other individual using the user's wireless device) specifying the location, triangulation using a plurality of receiving antennas, global positioning system and other similar location detection techniques. In some embodiments, the system 120 can employ a location technique described in U.S. Pat. No. 6,473,038, issued to Patwari et al., which is incorporated herein by reference in its entirety, where a location is determined by measuring signals transmitted between known location devices and unknown location devices. Some embodiments employ a method and/or apparatus for verifying a wireless device location, such as the method and apparatus described in U.S. Patent Application Publication No. 2002/0098851, filed by Walczak et al., which is incorporated herein by reference in its entirety. Knowing the location allows the processing center to direct emergency services and/or members of the emergency contact list to the location. In some embodiments, the physical geographic location of the user/victim can be derived immediately and automatically from the data packet(s) communicating the request for emergency services. This eliminates the need for the user/victim to verbally communicate this information to the processing center and/or emergency services.

The contact with the members of the emergency contact list can be notified through substantially any method. In some embodiments, the processing center 132 employs individuals that verbally contact the members of the list by wired or wireless phones. In some embodiments, the processing center 132 directly contacts the member of the emergency contact list by wired or wireless phone and issues an electronic or recorded verbal message. In these embodiments, the electronic or recorded message can direct the member of the group to contact an alternate phone number to receive further information.

In some embodiments, the members of the emergency contact list can be contacted using messaging on wireless devices owned by the members of the contact list and/or to computers via the Internet (such as at a parents' email address). For example, in some preferred embodiments, the processing center 132 utilizes instant messaging applications over network server based and/or peer-to-peer architectures. A user of the emergency contact services populates and/or generates his or her emergency contact list with instant messaging addresses. Additionally and/or alternatively, the user can simply populate his or her instant messaging addresses in a normal operation and can additionally identify, within the normal instant messaging address book, certain individuals who are to be contacted in emergency situations. Some embodiments employ a selective dynamic group creation apparatus or process that appears similar to or is implemented through instant messaging capabilities. The generation of the contact list can be created, updated, edited and/or deleted at substantially any time as conditions change.

When populating the emergency contact list and/or identifying those individuals to be contacted, the user can further identify the types of emergencies for which an individual on the list is to be contacted. For example, if a user is having heart problems (such as an individual who recently had a heart attack or underwent by-pass surgery), that user can include his cardiologist on his emergency contact list as well as, potentially, his spouse, children, and others. Similarly, a pregnant woman nearing the end of her pregnancy can establish a selective dynamic emergency contact list to notify, for example, her obstetrician, midwife, her husband, and her parents or in-laws for when she goes into labor and/or in case of other emergencies.

Figure 2:
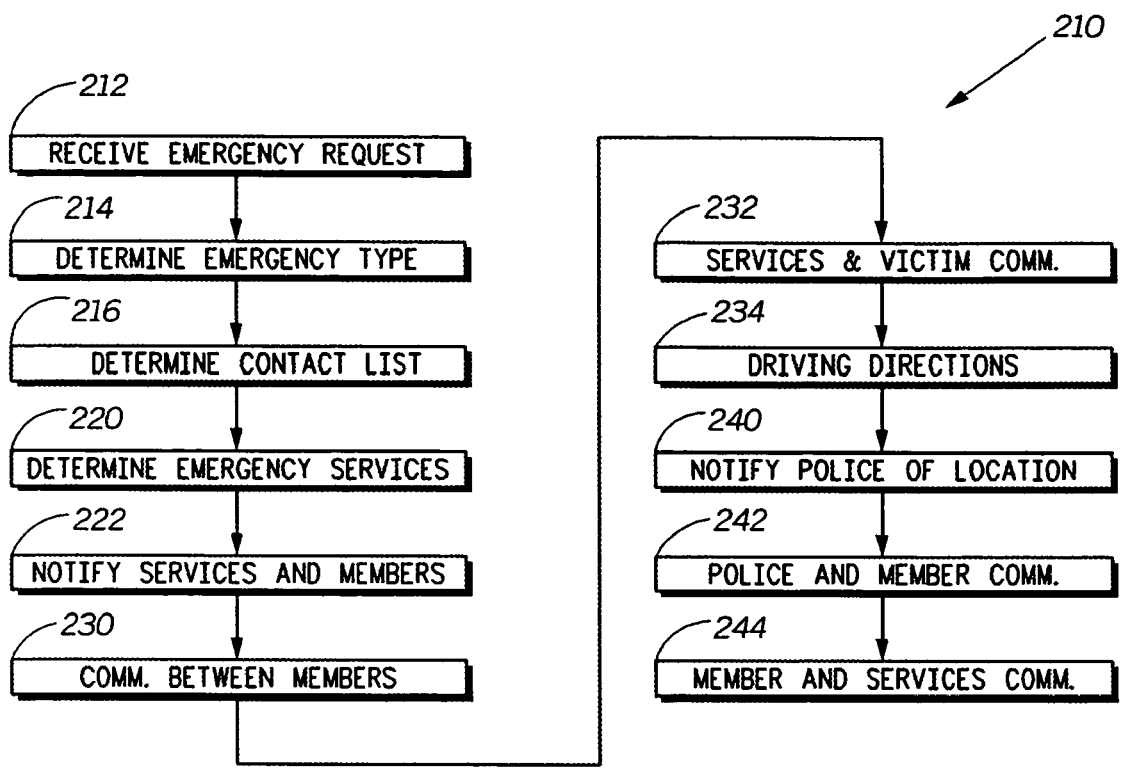
FIG. 2 depicts a simplified flow diagram of a process for dispatching emergency services and contacting members of a dynamic emergency contact list.

FIG. 2 depicts a simplified flow diagram of a process 210 for dispatching emergency services and contacting members of a dynamic emergency contact list. In step 212 an emergency request is received. In step 214 the type of emergency is determined. In step 216 an emergency contact list is retrieved according to the identified type of emergency. In some embodiments, which of a plurality of emergency contact lists to utilize is determined according to the type of emergency, a time of day, a day of the week, a location of the user submitting the request and/or other similar conditions and combinations of conditions. In step 220, the process determines the type of emergency services to be contacted based on the type of emergency and/or the contact list. In step 222, the emergency services and the members of the contact list are contacted.

In some embodiments, the process 210 can additionally include steps 230–244, to provide additional features and/or communication. In step 230, the process establishes direct communication between two or more members of the contact list. In step 232 direct contact between the emergency services and the user/victim are attempted to be established, if the user can communicate through his/her device 122. In step 234, one or more members are supplied driving directions to the location where the user/victim is located and/or to the hospital or other facility to which the user/victim is being transported. In step 240, the police are notified of a location of one or more members of the contact list (and in some embodiments, a direction of travel if the member is on the move). In step 242, direct communication is established between one or more members and the police to allow coordination between the member and the police. In some embodiments, the process 210 further includes step 244 where direct communication is established between the emergency services (and/or facility (e.g., hospital) providing medical care) and one or more members of the contact list (e.g., a parent or guardian). The process can include additional processing steps to implement further features and functions as described herein.

Figure 3:
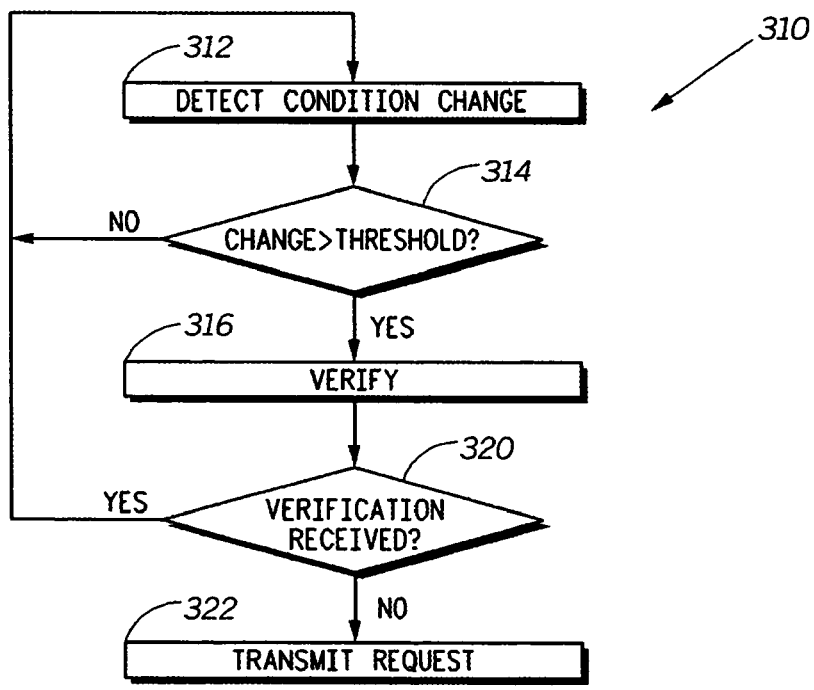
FIG. 3 depicts a simplified flow diagram of a process where a wireless device issues a request for emergency services without user interaction.

FIG. 3 depicts a simplified flow diagram of a process 310 where a wireless device, such as a wireless cell phone, pager, a medical device with wireless communication capabilities, or other such device issues a request for emergency services without user interaction. For example, the wireless device 122 can include sensors that identify emergency situations. Additionally and/or alternatively, the wireless device can couple with sensors that monitor conditions and signal the wireless device if changes to the conditions are detected and/or exceed threshold levels.

Still referring to the process 310 of FIG. 3, in step 312, one or more sensors detect one or more conditions indicating an actual or potential emergency incident. In step 314, it is determined if the conditions and/or change in conditions exceed one or more threshold levels. For example, if a sensor is monitoring a user's heart rate and a change in the heart rate is detected, step 314 determines if the change in heart rate exceeds a threshold, such as the change in heart rate is a drop in heart rate and the drop exceeds 45 beats per minute within a predefined period of time. Similarly, if the change is a drop in heart rate, the threshold can be such that if the number of beats per minute drops below a fixed threshold (e.g., below 30 beats per minute), the threshold is exceeded. In some embodiments, the threshold defines a condition, such as, whether a user's heart stopped.

If the change in the condition does not exceed the threshold, the process returns to step 312 to await further detected changes in conditions. In some embodiments, if the change in conditions exceeds the threshold, optional step 316 can be entered where a verification of the detected conditions is initiated. This verification can be initiated by sending a signal or generating a sound or alarm to which a user responds. In step 320, the process 310 determines if the emergency condition is verified. If a verification is detected that the emergency does not exists (e.g., a response to the alarm is detected), the process returns to step 312 to await a change in detected conditions. If a verification that an emergency does exist (e.g., no response is received to an alarm), the process continues to step 322 where a wireless communication is initiated requesting emergency services. In some embodiments, this request can additionally include an emergency contact list which is forwarded to the processing center 132.

Figure 4:
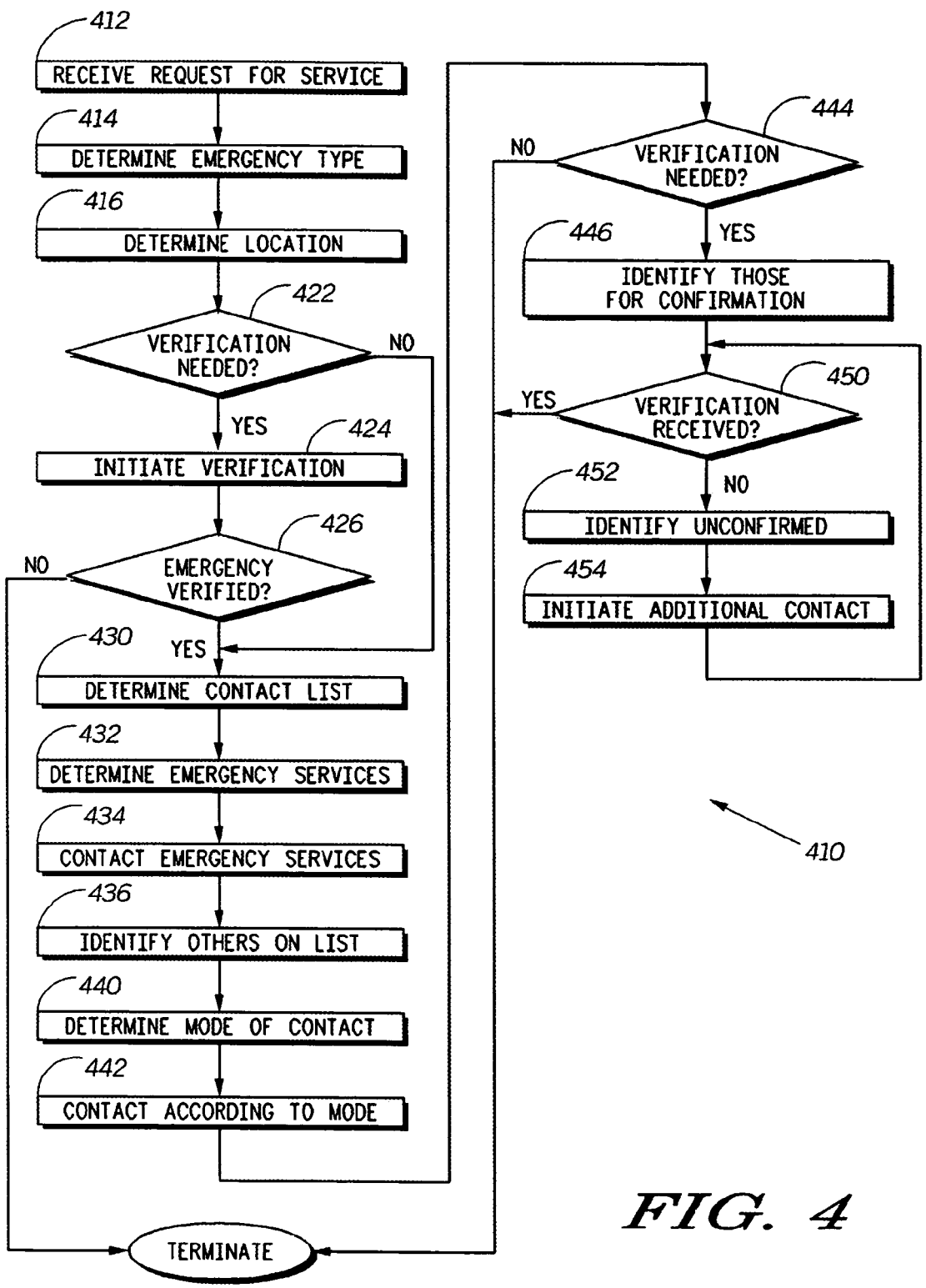
FIG. 4 depicts a simplified flow diagram of a process for contacting emergency services as well as identifying and contacting additional individuals and/or groups identified in an emergency contact list according to some embodiments.

FIG. 4 depicts a simplified flow diagram of a process 410 for contacting emergency services as well as identifying and contacting additional individuals and/or groups identified in an emergency contact list according to some embodiments. In step 412 a request for emergency services is received and/or detected. The request can be initiated by a user or other individual (e.g., a witness or passerby) from a user's device 122 or another device, such as a wireless phone, pager, medical alert device, two-way communication device or personal digital assistant. Alternatively and/or additionally, the request for emergency services can be initiated by the wireless device 122 after detection of a change in conditions that exceed one or more thresholds. In some embodiments a user can utilize another person's wireless device to contact the processing center and supply an identification (e.g., a code) to allow the processing center to identify the user.

Following step 412, the process continues to step 414 where the type of emergency is identified. In situations where a user or other individual is vocally relaying the emergency, an operator, voice recognition device or other means at the processing center receives and enters the emergency situation. When contact is initiated by sensors, the wireless device indicates the type of emergency. Similarly, if a predefined code is entered by a user (e.g., 911 or some other predefined and/or user defined code), the type of emergency is identified through the received code.

In step 416, a determination of the location of the device (and the user) is initiated. This determination can be through triangulation, the user identifying his/her position, GPS, positioning of wireless receiving towers receiving and relaying the emergency request and other such methods. In step 422, the process determines if a verification of the emergency request is needed. For example, in those situations where a user or other individual is initiating a vocal call to the processing center, verification is not needed. Similarly, if a predefined code is entered by a user, the verification may not be needed. Alternatively, when a sensor is initiating the request, the processing center may initiate a verification. This verification can be initiated when the device with the sensors does not perform a verification or in addition to the verification preformed by the wireless device 122.

If verification is not needed, the process continues to step 430; otherwise the process continues to step 424. In step 424, the verification is initiated, such as transmitting a signal to activate an alarm (e.g., ringing of the device to sound). In some embodiments, this alarm may be generated in addition to a verification and/or even when a verification is not needed. The alarm may be generated as a beacon to direct attention to the user so that individuals near the user might be notified of the emergency situation and/or to help emergency crews locate the individual. For example, the alarm or alert beacon might be activated later when crews are closer to the user, or generated periodically. In some embodiments, the crews can issue a request for the alarm to be activated once they are close to the user, or the wireless system or some other system can monitor the crews location (e.g., with wireless phone, GPS or other method) and activate the alarm when the crews are within a predefined distance or range of the user and/or device 122. This verification can be continued until a response is received (e.g., until the emergency crews initiate a response), or if the user response indicating later that the emergency situation has passed or was never an emergency. In some embodiments, the process 410 can be interrupted at any point if verification is later received during any later steps. Further, the interrupt, in some embodiments, can trigger the processing center to recall the emergency services.

In step 426, it is determined if a verification that an emergency situation does exist. If it is determined that the emergency situation does not exist, the process terminates. If it is determined that the emergency situation does exist, the process continues to step 430. In step 430, the process determines if an emergency contact list is available for the user/device and retrieves the list if available. The list can be specific to the type of emergency or a general list. In step 432, the process determines the kinds of emergency services that are needed. This determination can be based on the retrieved list, the type of emergency, the location of the user/device and other such factors.

In step 434 the emergency services are contacted. In some embodiments, the emergency services are defined with a higher priority than other members of the emergency contact list. The list can include a hierarchy that defines an order of notification. In step 436, other individuals and/or groups on the emergency contact list are identified according to the identified emergency type. In step 440, a mode of contacting each of the individuals/groups on the emergency contact list is determined. As discussed above, the contact with the members of the list can be through substantially any method, such as messaging, paging, direct contact with vocal communication and other methods. In some embodiments, multiple methods can be employed to ensure contact with the individuals is made. The method of contact can be specified in the list or a default can be used depending on the amount of information provide in the list. In step 442, the members of the contact list are notified of the emergency. In some embodiments, contacting of the members of the contact list or network is initiated simultaneously with the notification of the emergency services.

In step 444, it is determined if verification of receipt of contact is needed from one or more of the members of the contact list. Again, this needed verification can be defined in the list or can be a standard procedure. If verification is not needed, the process 410 can terminate. If verification is needed, the process continues to step 446 where those members of the list that need confirmation are identified. In step 450, it is determined if verification is received from each identified member needing confirmation. If verification from all members needing confirmation is received, the process can terminate. If verification is not received, the process continues to step 452 to identify those members of the contact list that have not verified receipt of notification.

In step 454, the process follows up with or re-notifies those members identified as not returning confirmation, by issuing additional notifications. Following the attempt to re-notify with an unconfirmed member of the list, the process returns to step 450 to determine if verification is received from each member requiring verification. This additional contact in step 454 may be initiated after a predefined period of time. Similarly, this additional contact can be initiated a predefined number of times, after which the process stops attempting to contact and/or leaves a message if possible and if a message has not already been issued. Further, some embodiments employ alternate modes of communication in attempting to follow up with members of the list. For example, the initial notification can be through messaging to a member's wireless device. The alternate mode can be substantially any mode of communication, including placing a call to a wireless device, sending an e-mail to an identified e-mail address, sending an instant message through an instant messaging server, sending a multimedia message, placing a call to an alternate contact phone number (work number, home number, etc.), paging an alternate wireless device and substantially any other method of communication.

In some embodiments, many of the steps of the process 410 are performed concurrently and are not necessarily performed sequentially. For example, in some embodiments, steps 414 and 416 can be concurrently implemented, and similarly can be implemented concurrently with step 422. Similarly, steps 430, 432, 436 and 440 can be implemented concurrently. Other embodiments use other combinations of concurrent and sequential implementation of the steps.

The processing center 132 can, in some embodiments, include a list of hospitals, emergency rooms, clinics and other facilities. Based on the location of the user/victim, the processing center can generate a dynamic list of the facilities that receive and provide attention to the user/victim. Once a list is generated, the facilities can be notified of the type of potential injuries (determined through sensor data and/or through other methods). This allows the facility expecting the user/victim to prepare for the types of potential injuries. Additionally, the facilities can determine if they can handle the user/victim based on current capacity, availability of doctors and specialist, and/or other conditions in determining if the facility would best serve the user/victim. Similarly, the emergency contact list can include a user's priority of facilities in case of emergencies.

In some embodiments, a customized or personal profile of the wireless device user can be stored on the wireless device 122, the processing center 132 associated with the wireless service provider or some other processing center providing emergency services contact, or stored in several places (e.g., both the wireless device and a central processing center). In some embodiments, each user can have multiple profiles depending on types of situations. The profile can include information such as medical history, medical contacts, allergies, primary and secondary languages, religious affiliation, organ donor status, personal contact information, insurance or medical plan information, or other important personal information. This profile can be instantly forwarded to emergency services and/or hospitals without having to solicit this information from the user/victim under emergency conditions, allowing the emergency services and/or hospital to better or more rapidly treat the user. The profile information can additionally allow facilities to request or bid to receive the user/victim to provide the best service.

In some embodiments, the emergency services (ambulance, fire department, police, etc.) and facilities would additionally receive a parent, guardian, spouse or other individual's or individuals' contact information, such as wireless phone number, work number and the like. Additionally and/or alternatively, the parent, guardian and/or spouse's wireless device can issue a broadcast to the emergency services and/or facilities upon receipt of the emergency notification. This allows the emergency services and facilities to gain direct access to other individuals that might be needed to provide authorization and/or other information for treatment. Further, the next of kin can be easily contacted in attempts to get authorization for organ transplants, which is typically very time sensitive.

Additionally, some embodiments access and utilize additional resources to provide member(s) of the contact emergency list that have been contacted with directions to an emergency treatment facility and/or the location of the user/victim. For example, the processing center can utilize the time of day, traffic conditions and other criteria to provide driving directions to the one or more members. Similarly, the police can be notified of the need for possible assistance to help the contacted member from the list to get to the hospital or accident scene. The analysis of the traffic, in some embodiments, can determine whether a police escort is needed and send a datagram to the police escort with the member's location and driving direction to coordinate the escort. In some embodiments a temporary connection can be established between the member and the police escort to allow them to dynamically share a direct communication, such as a temporary push to talk capability and/or cellular connection. Similarly, direct communication can be established, in some embodiments, between the user (or other person on scene) and the emergency services. This can be through cellular communication, push to talk capabilities or other communication techniques. As such the emergency services can get initial conditions and/or provide potentially life saving instructions.

As discussed above, the wireless communication device 122 can initiate the emergency contact. The wireless device 122 can include any one or more of a number of features for triggering a request for emergency services, depending on the type of situations under which a customer desires to trigger a request. For example, a trigger may include a panic button on the device, a particular keying sequence (i.e., manually pressing predetermined keys on a key pad in a specific order), a strong impact sensor (for example, for use in automatically transmitting a request in the event of a high-impact collision), a heat sensor (for example, for use in automatically requesting emergency services in the event of a fire), a medical sensor (e.g., for automatically triggering a request for emergency services upon the detection of the cessation of a heart beat or other physical or medical condition) and other sensors. In addition, the wireless communication device 122 may be configured to transmit a request for emergency services by a predetermined voice activation sequence.

Configuring the wireless device 122 to initiate the emergency request provides added safety to users and can simplify the request. Further, the activation by the wireless device can help to ensure a more rapid response for users, especially when the users are unable to initiate the emergency request themselves.

The present embodiments provide a user with the capability to use his or her own wireless device, or another person (e.g., witness or passerby) to use someone else's wireless device (e.g., the victim's wireless device) to quickly and easily notify parent(s), guardian(s), doctor of a pending emergency. The contact is implemented through wireless communications, messaging, email, voice call or other such techniques.

Figure 5:
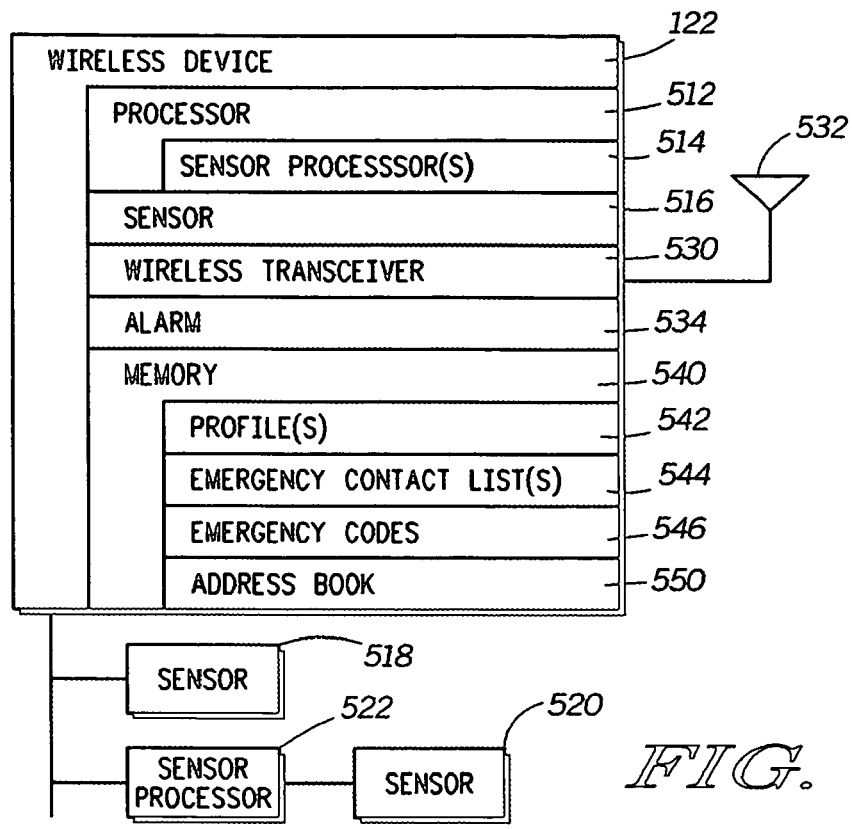
FIG. 5 depicts a simplified block diagram of a wireless device according to some embodiments.

FIG. 5 depicts a simplified block diagram of a wireless device 122 according to some embodiments. The device includes a processor 512 that performs at least a portion of the operation of the wireless device. The processor can be implemented through a microprocessor or other similar processor and can include a sensor processor 514. The sensor processor receives communications from one or more sensors 516 internal to the wireless device 122 and/or one or more sensors 518, 520 external to the device 122. As described above, the sensors can monitor conditions and forward signals to the sensor processor 514 regarding the conditions. Some sensors, such as sensor 520, can be incorporated with or coupled to external sensor processors 522.

The external processor 522 can analyze the sensed conditions and communicate with the sensor processor and/or other components of the wireless device 122 when conditions exceed and/or fall below defined thresholds.

The wireless device includes a wireless transceiver 530 for transmitting and receiving wireless communications. The transceiver couples with one or more antennas 532 to broadcast and receive wireless communications. An alarm 534 can also be included in some embodiments of the wireless device 122. The alarm can be triggered to facilitate verification of detected emergency conditions. In some embodiments the alarm can simply be part of an audio output standard on many wireless devices.

Further, the wireless device can include a memory 540 that stores substantially any data, information, processes, executables, scripts, programs and other such data and processes. The memory can store, for example, a user's profile 542 that can include information about the user (such as medical history, allergies, medications currently being taken, insurance information and other such information). One or more emergency contact lists 544 can also be stored in the memory 540. As discussed above, the contact list 544 includes one or more members to be contacted in the event of an emergency. A different list can be included for a plurality of different potential emergencies. These lists can be adjusted, deleted, updated and new lists added at any time. Some embodiments store emergency codes 546 in the memory that identify certain emergency conditions. These emergency codes can be forwarded to the processing center 132 to identify the type of emergency for which a request is being made. Similarly, the emergency codes can identify which one or more emergency contact lists are to be utilized in contacting members in the event of emergencies.

An address book 550 can also be included in the memory. The address book can be a standard address book utilized in many wireless devices. In some embodiments, however, the address book can include indications of emergency contact information. For example, the address book can include indicators that members of the address book are to be contacted in the event of certain emergency situations, and the emergency contact list can reference the address book to extract one or more members for a list. Additionally, the address book can provide alternate contacts for members of the list.

Figure 6:
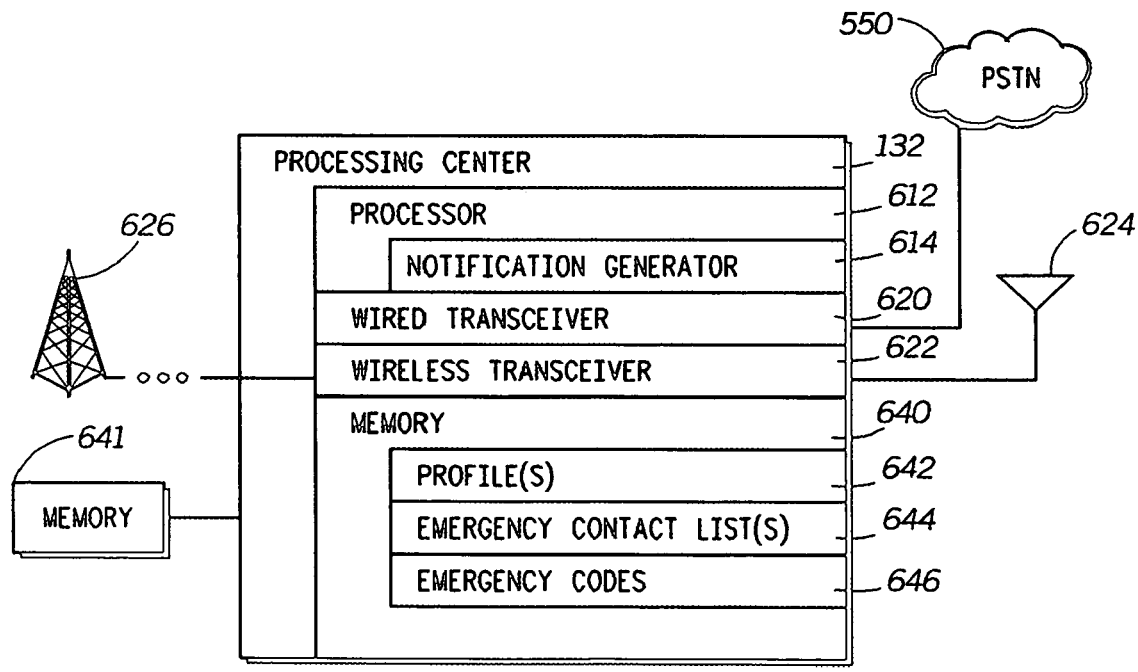
FIG. 6 depicts a simplified block diagram of a processing center according to some embodiments.

FIG. 6 depicts a simplified block diagram of a processing center 132. The processing center can include a processor 612, which can be implemented through one or more microprocessors, computers, controllers and other similar processors or combination of devices. The processor 612 provides at least a portion of control over the processing center 132. The processor, in some embodiments, includes a notification generator 614. The notification generator can receive emergency requests, process the requests to extract emergency services that need to be contacted as well as extract members of a contact list and their respective mode of contact. The notification generator can then generate notification for each of the emergency services and/or members of the contact list through defined preferred modes of contact. In some embodiments, the notification generator 614 notifies human operators to contact the emergency services and/or members of the contact list.

The processing center 132 includes, in some preferred embodiments, a wired transceiver 620 and a wireless transceiver 622. The wireless transceiver can couple with a local antenna 624 and/or a remote antenna 626. The wired transceiver can couple with substantially any type of wired network (which can further couple with additional wired and wireless communication systems and/or networks), such as a Public Switched Telephone Network (PSTN) network 550.

In preferred embodiments, the processing center includes and/or couples with a memory 640, 641 for storing substantially any data, information, processes, executables, scripts, programs and other such data and processes. The memory can store, for example, a user's profile 642 that can include information about different users (such as medical history, allergies, medications currently being taken, insurance information and other such information). In some embodiments, the memory 640 and/or 641 further stores emergency contact lists 644 for a plurality of users and for a plurality of emergency situations. As discussed above, the contact list 644 includes one or more members to be contacted in the event of an emergency. A different list can be included for any number of different potential emergencies. These lists can be adjusted, deleted, updated and new lists added at any time. Typically, the users alter the emergency contact lists 644. Emergency codes 646 can also be stored in some embodiments. As discussed above, the emergency codes 646 can be used to identify users as well as certain emergency conditions. These emergency codes can be forwarded to the processor 612 to identify the user requesting the emergency and the type of emergency for which a request is being made. Similarly, the emergency codes can identify which one or more emergency contact lists are to be utilized in contacting members in the event of emergencies.

As discussed above, some embodiments sound an alarm on the wireless device 122. This alarm can help emergency crews locate the user/victim. In some embodiments, alerts can include audio, vibration, visual and non-visual lighting and/or a combination. In some embodiments, incoming calls and/or communications are blocked and the wireless device is forced into an energy saving mode to conserve as much power as possible. When the wireless device 122 is powered up during this period of time, only those portions needed to generate the alarm are activated. In some preferred embodiments, other portions of the device can be intermittently and/or periodically be powered up; for example, the receiver can be powered up to periodically try and verify the need for emergency services, and the transmitter can be powered up to continue to verify location and other such events. Further, the conserved power mode can be overridden by the user, witness, emergency crews and/or other individuals to initiate other actions.

The present embodiments automatically contact emergency services as well as contacting one or more members of an emergency contact list when a request for emergency services is received. This allows loved ones and individuals that may provide added benefit and/or improved care to be quickly notified. Further, the notification allows the members of the list to more quickly get to the victim and provide potentially life saving information as well as other benefits.

While these embodiments have been described by means of specific embodiments and applications thereof, numerous modifications and variations could be made thereto by those skilled in the art without departing from the scope of the invention set forth in the claims.

What is claimed is:

1. A method for use in providing wireless communications, comprising, at a processing center:
   receiving a request for emergency services from a user using a wireless device;
   identifying the user from whom the emergency services are requested;
   evaluating the request for emergency services;
   retrieving an emergency contact list containing at least one member to be contacted, the emergency contact list retrieved from the wireless device used by the user by the processing center;
   contacting the at least one member of the emergency contact list and notifying the member of the received request for emergency services;
   verifying that the at least one emergency contact received the notification; and
   re-notifying the at least one emergency contact when verification is not received that the at least one emergency contact receive the notification.

2. The method of claim 1, further comprising:
   notifying one or more emergency services of the received request for emergency services.

3. The method of claim 2, wherein the notifying the at least one member comprises issuing one or more messages to an identified device associated with the at least one member of the contact list.

4. The method of claim 2, further comprising:
   establishing communication between an individual submitting the request for emergency services and at least one of the notified emergency services.

5. The method of claim 4, wherein the establishing communication comprises at least one of push to talk, interconnect and messaging capabilities for each of the individual's submitting the request and the at least one emergency services.

6. The method of claim 2, further comprising:
   establishing group communication between the at least one member of the emergency contact list and one or more of the emergency services.

7. The method of claim 1, further comprising:
   establishing direct communication between an individual submitting the request for emergency services and the at least one member of the emergency contact list.

8. The method of claim 1, further comprising:
   determining traffic conditions; and
   issuing driving directions to the at least one member of the contact list.

9. The method of claim 1, further comprising:
   contacting an escort; and
   directing the escort to the at least one member of the contact list.

10. The method of claim 1, further comprising: detecting a change in a condition tat exceeds a threshold; and
    initiating the transmission of the request for emergency services without user intervention.

11. The method of claim 1, further comprising:
    identifying a type of emergency;
    determining a type of emergency services according to the identified type of emergency services; and
    wherein the retrieving the emergency contact list comprises retrieving the emergency contact list for the identified type of emergency.

12. The method of claim 1, further comprising:
    determining which of a plurality of emergency contact lists are to be retrieved according to at least one of a time of day, day of the week, and location of an individual submitting the request for emergency services.

13. The method of claim 1, further comprising:
    initiating an alert beacon indicating a location of a device transmitting the request for emergency services.

14. A system for providing emergency notification between a processing center and a remote wireless device, the processing center comprising:

a processor;

a memory for storing at least one emergency contact list; and a wireless transceiver that wirelessly receives a request for emergency service and the at least one emergency contact list from the remote wireless device;

wherein the processor evaluates the received request for emergency service, retrieves the at least one emergency contact list associated with the received request for emergency services, the emergency contact list received from the remote wireless device in response to the request for emergency service, and generate a communication to at least one member from the at least one emergency contact list; and wherein the processor further verifies that the at least one member received the notification; and the processor re-notifies the at least one member when verification is not received that the at least one member received the notification.

15. The system of claim 14, wherein the processor communicates to a plurality of members identified from the at least one emergency contact list to notify each of the plurality of members of the request for the emergency service.

16. The system of claim 15, further comprising:

a wireless communication device that wirelessly transmits the request for emergency service.

17. The system of claim 15, wherein the processor further determines a type of emergency and notifies at least one emergency service of the request for emergency service.

18. The system of claim 14, wherein the processor initiates an alert location beacon.

19. The system of claim 18, wherein the alert beacon is at least one of an audio, vibration, visual lighting and non-visual lighting.

* * * * *